(12) United States Patent
Iida

(10) Patent No.: US 7,640,310 B2
(45) Date of Patent: *Dec. 29, 2009

(54) NETWORK FACSIMILE APPARATUS AND TRANSMISSION METHOD

(75) Inventor: Junichi Iida, Yokohama (JP)

(73) Assignee: Panasonic Communications Co., Ltd., Fukuoka (JP)

(*) Notice: Subject to any disclaimer, the term of this patent is extended or adjusted under 35 U.S.C. 154(b) by 817 days.

This patent is subject to a terminal disclaimer.

(21) Appl. No.: 11/206,867

(22) Filed: Aug. 19, 2005

(65) Prior Publication Data

US 2005/0278412 A1 Dec. 15, 2005

Related U.S. Application Data

(62) Division of application No. 09/314,958, filed on May 20, 1999, now Pat. No. 6,956,663.

(30) Foreign Application Priority Data

Jan. 27, 1999 (JP) .................................. 11-18998

(51) Int. Cl.
*G06F 15/16* (2006.01)
(52) U.S. Cl. .................. 709/206; 709/203; 709/219; 709/204; 709/205; 709/217; 709/218; 358/1.15
(58) Field of Classification Search .............. 709/206, 709/217, 203, 204, 205, 218, 219; 358/1.15
See application file for complete search history.

(56) References Cited

U.S. PATENT DOCUMENTS 5,396,341 A   3/1995  Takahashi et al.
5,530,852 A   6/1996  Meske, Jr. et al.
5,675,507 A * 10/1997 Bobo, II ...................... 709/206
5,720,014 A   2/1998  Ikeda et al.
5,805,298 A * 9/1998  Ho et al. ...................... 358/402
5,881,233 A   3/1999  Toyoda et al.

(Continued)

FOREIGN PATENT DOCUMENTS

DE   19704694   8/1997

(Continued)

OTHER PUBLICATIONS

"Web programming Secrets with HTML, CGI, and Perl", Chapter 1, (pp. 3-42) and Chapter 11 (pp. 329-356). Additionally a Japanese version of Chapter 11 and a translation thereof are attached.

(Continued)

*Primary Examiner*—Liangche A Wang
(74) *Attorney, Agent, or Firm*—Greenblum & Bernstein P.L.C.

(57) ABSTRACT

A communication apparatus is connected to a terminal apparatus via a network. The communication apparatus includes an e-mail receiver that performs an e-mail reception via the network. A file generator generates an HTML file for a web page indicating a result of the e-mail reception performed by the e-mail receiver. A storage stores the HTML file generated by the file generator. A web server transmits the HTML file to the terminal apparatus via the network so that the web page is displayed at the terminal apparatus.

18 Claims, 19 Drawing Sheets

U.S. PATENT DOCUMENTS

| | | | |
|---|---|---|---|
| 5,953,392 A * | 9/1999 | Rhie et al. | 379/88.13 |
| 6,020,980 A * | 2/2000 | Freeman | 358/402 |
| 6,055,240 A * | 4/2000 | Tunnicliffe | 370/428 |
| 6,058,169 A * | 5/2000 | Bramnick et al. | 379/100.01 |
| 6,101,526 A | 8/2000 | Mochizuki | |
| 6,192,258 B1 * | 2/2001 | Kamada et al. | 455/566 |
| 6,208,345 B1 * | 3/2001 | Sheard et al. | 715/853 |
| 6,230,189 B1 | 5/2001 | Sato et al. | |
| 6,321,231 B1 * | 11/2001 | Jebens et al. | 707/104.1 |
| 6,366,650 B1 * | 4/2002 | Rhie et al. | 379/88.13 |
| 6,385,655 B1 | 5/2002 | Smith et al. | |
| 6,396,848 B1 | 5/2002 | Ohta | |
| 6,418,169 B1 * | 7/2002 | Datari | 375/240.28 |
| 6,618,747 B1 | 9/2003 | Flynn et al. | |
| 6,825,955 B1 | 11/2004 | Shibata | |

FOREIGN PATENT DOCUMENTS

| | | |
|---|---|---|
| EP | 0801492 | 10/1997 |
| EP | 0833266 | 4/1998 |
| EP | 835011 | 4/1998 |
| EP | 0838768 | 4/1998 |
| EP | 0845894 | 6/1998 |
| JP | 3-261266 | 11/1991 |
| JP | 6-30038 | 2/1994 |
| JP | 7-38686 | 2/1995 |
| JP | 7-212395 | 8/1995 |
| JP | 9-163064 | 6/1997 |
| JP | 9-181874 | 7/1997 |
| JP | 0 9233243 | 9/1997 |
| JP | 10-13602 | 1/1998 |
| JP | 10-63590 | 3/1998 |
| JP | 10-75330 | 3/1998 |
| JP | 10-98606 | 4/1998 |
| JP | 10-107836 | 4/1998 |
| JP | 10107840 | 4/1998 |
| JP | 10-149270 | 6/1998 |
| JP | 10-179581 | 7/1998 |
| JP | 10-191010 | 7/1998 |
| JP | 10-228428 | 8/1998 |
| JP | 10-247179 | 9/1998 |
| JP | 10511792 | 11/1998 |
| JP | 11-88591 | 3/1999 |
| WO | 97/09682 | 3/1997 |
| WO | 97/38510 | 10/1997 |
| WO | 98/23058 | 5/1998 |

OTHER PUBLICATIONS

"Design of Unix Operation System", Chapter 4 (pp. 60-88).
English language Abstract of JP 9-181874.
English language Abstract of JP 10-191010.
English language Abstract of JP 6-30038.
English Language Abstract of JP 10/228428.
English Language Abstract of JP10-75330.
English Language Abstract of JP3-261266.
English Language Abstract of JP11-88591.
English Language Abstract of JP10-107840.
English Language Abstract of JP 10-13602.
English Language Abstract of JP 10-98606.
English Language Abstract of JP 09-9233243.
"Web programming Secrets with HTML, CGI, and Perl", Chapter 1, (pp. 3-42) and Chapter 11 (pp. 329-356). Additionally a Japanese version of Chapter 11 and a translation thereof are attached, Jun. 29, 1996.
"Design of Unix Operation System", Chapter 4 (pp. 60-88), Sep. 26, 1986.

* cited by examiner

| DOCUMENT NUMBER | DOCUMENT FILE NAME | REGISTERED DATA | SENDER | TITLE |
|---|---|---|---|---|
| 0001 | fax0001.tif | 1998.08.03 14:45:31 | 03-1234-5678 | G3FAX RECEIVED DOCUMENT |
| 0002 | mail0001.tif | 1998.08.05 11:30:15 | ifax@abc.co.jp | MAP |
| 0003 | audio0001.wav | 1998.08.13 19:15:20 | 03-7789-1122 | TELEPHONE SPEECH |
| | | | | |

FIG. 7

```
<HTML>
<HEAD>
<TITLE>NETWORK RECEIVED DOCUMENT</TITLE>
</HEAD>
<BODY BGCOLOR="#ffffff" onLoad="focus()">
<FORM NAME="MyForm">
<INPUT TYPE="hidden" NAME="mbox" VALUE="ifax">

<Table Border="1" CellPadding="2">
<Tr><Th>SELECT</Th><Th>DOCUMENT NUMBER</Th><Th NOWRAP>
REGISTERED DATA  </Th><Th>  SENDER  </Th><Th>  TITLE  </Th></Tr>
```

| | |
|---|---|
| `<!-- No.000300F3 -->` ←DOCUMENT NUMBER HEX<br>`<Tr><Td><INPUT TYPE="checkbox" VALUE="00243"></Td>`<br>`<Td><A HREF="tiff/nim00243.tif">00243</A></td>`<br>`<Td>1998.10.07 20:45:53</Td>`<br>`<Td>ifax@tora.rdmg.mgcs.mei.co.jp</Td>`<br>`<Td>IMAGE from Internet FAX</Td></Tr>` | RECEPTION LIST FIRST LINE |
| `<!-- No.000300F0 -->`<br>`<Tr><Td><INPUT TYPE="checkbox" VALUE="00240"></Td>`<br>`<Td><A HREF="tiff/nim00240.tif">00240</A></td>`→DOCUMENT<br>`<Td>1998.10.07 20:14:53</Td>`→DATA      NUMBER<br>`<Td>ifax@eos5.rdmg.mgcs.mei.co.jp</Td>`→SENDER<br>`<Td>IMAGE from Internet FAX</Td></Tr>`→TITLE | RECEPTION LIST SECOND LINE |
| `<!-- No.000300ED -->`<br>`<Tr><Td><INPUT TYPE="checkbox" VALUE="00237"></Td>`<br>`<Td><A HREF="tiff/nim00237.tif">00237</A></td>`<br>`<Td>1998.10.07 20:08:51</Td>`<br>`<Td>ifax@eos5.rdmg.mgcs.mei.co.jp</Td>`<br>`<Td>IMAGE from Internet FAX</Td></Tr>` | RECEPTION LIST THIRD LINE |
| `<!-- No.000300EA -->`<br>`<Tr><Td><INPUT TYPE="checkbox" VALUE="00234"></Td>`<br>`<Td><A HREF="tiff/nim00234.tif">00234</A></td>`<br>`<Td>1998.10.07 18:00:04</Td>`<br>`<Td>ifax@usagi.rdmg.mgcs.mei.co.jp</Td>`<br>`<Td>IMAGE from Internet FAX</Td></Tr>` | RECEPTION LIST FOURTH LINE |
| `<!-- No.000300E9 -->`<br>`<Tr><Td><INPUT TYPE="checkbox" VALUE="00233"></Td>`<br>`<Td><A HREF="tiff/nim00233.tif">00233</A></td>`<br>`<Td>1998.10.07 17:55:35</Td>`<br>`<Td>ifax@usagi.rdmg.mgcs.mei.co.jp</Td>`<br>`<Td>IMAGE from Internet FAX</Td></Tr>` | RECEPTION LIST FIFTH LINE |

```
<!-- No.00000000 -->  ←INDICATE DATA END
</Table></UL>
</FORM>
</BODY>
</HTML>
```

FIG. 8

INTERNET RECEIVED DOCUMENT

| MENU | SELECT | DOCUMENT NUMBER | REGISTERED DATA | SENDER | TITLE |
|---|---|---|---|---|---|
| | ☐ | 00243 | 1998.10.07.20:45:53 | ifax@tora.rdmg.mgcs.mei.co.jp | IMAGE from Internet FAX |
| | ☐ | 00240 | 1998.10.07.20:14:53 | ifax@eos5.rdmg.mgcs.mei.co.jp | IMAGE from Internet FAX |
| | ☐ | 00237 | 1998.10.07.20:08:51 | ifax@eos5.rdmg.mgcs.mei.co.jp | IMAGE from Internet FAX |
| | ☐ | 00234 | 1998.10.07.18:00:04 | ifax@usagi.rdmg.mgcs.mei.co.jp | IMAGE from Internet FAX |
| | ☐ | 00233 | 1998.10.07.17:55:35 | ifax@usagi.rdmg.mgcs.mei.co.jp | IMAGE from Internet FAX |

[HOME]

[SEND]
[PRINT]
[DELETE]
[EDIT]
[MOVE]

FIG. 12

USER SETTING

| SETTING OF RECEIVED DOCUMENT | | | |
|---|---|---|---|
| FAX RECEIVED DOCUMENT | ○ ONLY PRINTING | ○ ONLY STORING | ● PRINTING AND STORING |
| NETWORK RECEIVED DOCUMENT | ○ ONLY PRINTING | ○ ONLY STORING | ● PRINTING AND STORING |

| SETTING OF DOCUMENT STORAGE PERIOD | | | |
|---|---|---|---|
| FAX RECEIVED DOCUMENT | ○ 1 DAY | ● 1 WEEK | ○ 1 MONTH |
| NETWORK RECEIVED DOCUMENT | ○ 1 DAY | ● 1 WEEK | ○ 1 MONTH |

[HOME]  [SET]  [CANCEL]

FIG. 17

COMMUNICATION RESULT REPORT                                    [HOME]

| No. | RECEPTION NUMBER | COMMUNICATION DATA | COMMUNICATION PARTNER | A NUMBER OF SHEETS | COMMUNICATION TYPE | COMMUNICATION DURATION TIME | CHARGE | MODE | CONDITION |
|-----|------------------|--------------------|------------------------|--------------------|---------------------|----------------------------|--------|------|-----------|
| 01  | 94               | 09-08 14:56        | 7-374-2935             | 01/01              | TRANSMISSION        | 00:01'30                   | 30     | G3   | GOOD      |
| 02  | 95               | 09-09 13:51        | 7-374-2935             | 00/01              | TRANSMISSION        | 00:00'46                   | 10     | G3   | 0544      |
| 03  | 96               | 09-09 13:51        | 7-374-2935             | 00/01              | TRANSMISSION        | 00:00'46                   | 10     | G3   | GOOD      |

FIG. 19

NETWORK FACSIMILE APPARATUS AND TRANSMISSION METHOD

This application is a divisional of U.S. patent application Ser. No. 09/314,958, filed on May 20, 1999, now U.S. Pat. No. 6,956,663 entitled "Network Facsimile Apparatus and Transmission Method" in the name of Junichi IIDA, the disclosure of which is expressly incorporated by reference herein in its entirety.

FIELD OF THE INVENTION

The present invention relates to a network facsimile apparatus and transmission method capable of performing transmission and reception of facsimile data and e-mail data connecting to a PSTN and a network such as the internet or LAN.

DESCRIPTION OF THE RELATED ART

Recently, it has been performed to connect a personal computer, work station, FAX server or the like to a network in order to transmit and receive an e-mail and facsimile and to browse homepages.

FIG. 1 illustrates a system structure in which facsimile transmission and reception is performed using a FAX server. The reception operation at a client machine (personal computer) will be described next. FAX modem 1001 receives a call from the PSTN and reads out image data to transmit to FAX server 1002. FAX server software operating at FAX server 1002 receives the image data. The FAX server stores the image data as an image data file at file server 1003 through the network. At this point, the storage of facsimile received data is finished.

To fetch the received image data into client machine 1004, a user starts a dedicated application at client machine 1004 and reads out the image data from file server 1003 through the network.

Further, a method of reusing facsimile received data by combining an internet FAX and a WWW server has been recently proposed. The method utilizes the function of the internet FAX which converts data received from the PSTN into an e-mail.

FIG. 2 illustrates a system structure in which facsimile transmission and reception is performed using an internet FAX and a WWW server. The reception operation at the client machine will be described.

Image data received at internet FAX 1101 via the PSTN is attached to an e-mail at internet FAX 1101 and is transmitted to WWW server 1103 as an attached file of e-mail.

The e-mail with the attached file transferred from internet FAX 1101 is received at e-mail server 1102 via a network. The e-mail with the attached file received at e-mail server 1102 is transferred to WWW server 1103 that is a destination again via the network.

WWW server 1103 stores the attached file of e-mail as image data to link to a homepage for facsimile reception. The storage of facsimile received data is finished at this point.

In order to fetch received data into client machine 1104, a user starts a WWW browser at client machine 1104 and accesses to the homepage for facsimile reception at WWW server 1103. The user reads out an image data file at client machine 1104 via the network from WWW server 1103.

A user performs the following operation in the case of performing simultaneous transmission of the image data that is downloaded at client machine 1104 to a plurality of other terminals. In the case of simultaneous transmission to a terminal as a G3 facsimile apparatus, the user transfers image data from client machine 1104 to a printer, sets the printed imaged data output from the printer at a facsimile apparatus, enters telephone numbers of simultaneous transmission destinations, and pushes a transmission button. In addition, in the case of simultaneous transmission to a terminal as an e-mail apparatus, the user sets a plurality of e-mail addresses of simultaneous transmission destinations as destinations using e-mail software, attaches the image data to an e-mail and pushes a transmission button.

However, in the system using the above-described internet FAX and WWW server, a simultaneous transmission of image data stored at the WWW server to other terminals results in a problem that network traffic is increased because the image data should be transferred between the internet FAX and the e-mail server, between the e-mail server and the WWW server and between the WWW server and the client machine.

SUMMARY OF THE INVENTION

An object of the present invention is to provide a network facsimile apparatus and transmission method capable of decreasing network traffic caused by data transmission and also of performing simultaneous transmission easily only by an instruction from a client machine.

The present invention provides a network facsimile apparatus which is able to communicate using both a telephone network and a computer network, and has a facsimile section which transmits and receives an image via the public switched telephone network, a mail section which transmits and receives an e-mail via the computer network, a web server which transmits a response to a client corresponding to a request from the client that is connected to the network apparatus via the computer network, a storage which stores received data including an image received by the facsimile section and data of an e-mail received by the mail section, and a structured document generating section which generates a structured document containing a description to request predetermined processing to the web server from the client, in which the web server has a transmission section which transmits the received data stored at the storage and the structured document generated by the structured document generating section to the client corresponding to a request from the client, and an interface which provides a received transmission request to the facsimile section or the mail section. Accordingly, when the network facsimile apparatus receives a transmission request from a client, the web server provides a structured document in homepage format corresponding to the transmission request, and the mail section or facsimile section transmits received data stored at the storage to a predetermined destination based on client entered data or selected item.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a structure diagram of a reception list management table;

FIG. 8 is a diagram illustrating a data example of a source file of a reception list html;

FIG. 12 is a structure diagram of an internet received document page provided by the network facsimile apparatus according to the above embodiment;

FIG. 17 is a structure diagram of a user setting page provided in the above embodiment;

FIG. 19 is a structure diagram of a communication result report page provided in the above embodiment.

DETAILED DESCRIPTION OF THE PREFERRED EMBODIMENTS

The embodiment of the present invention will be described below in detail with reference to drawings.

Figure 1:
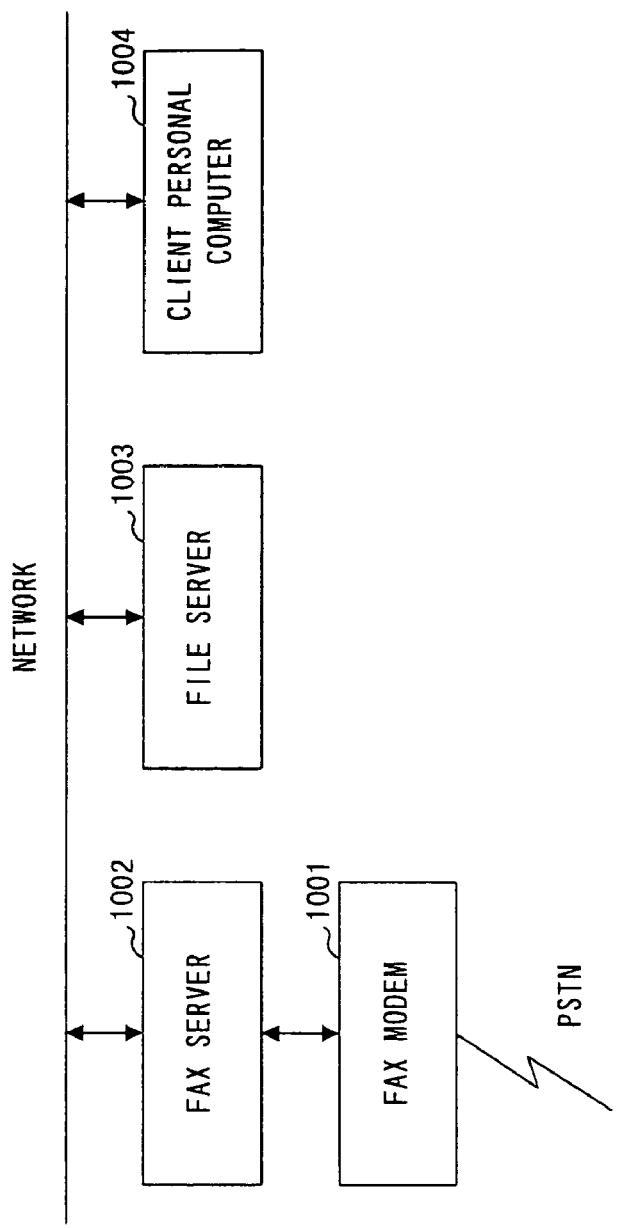
FIG. 1 is a configuration diagram of facsimile transmission and reception system using a FAX server.
Figure 2:
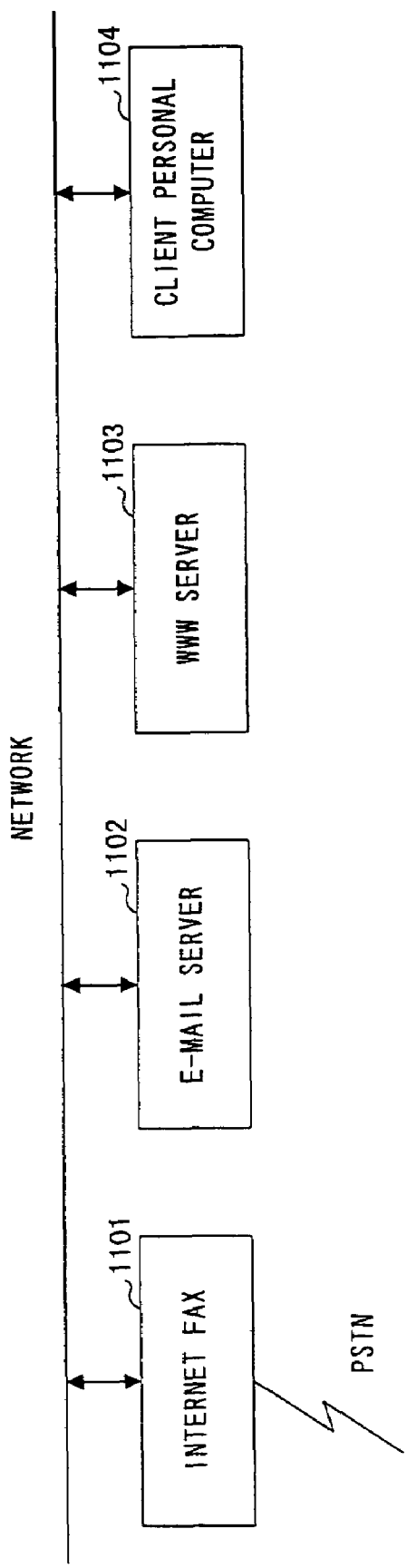
FIG. 2 is a configuration diagram of facsimile transmission and reception system using an internet FAX and a WWW server.
Figure 3:
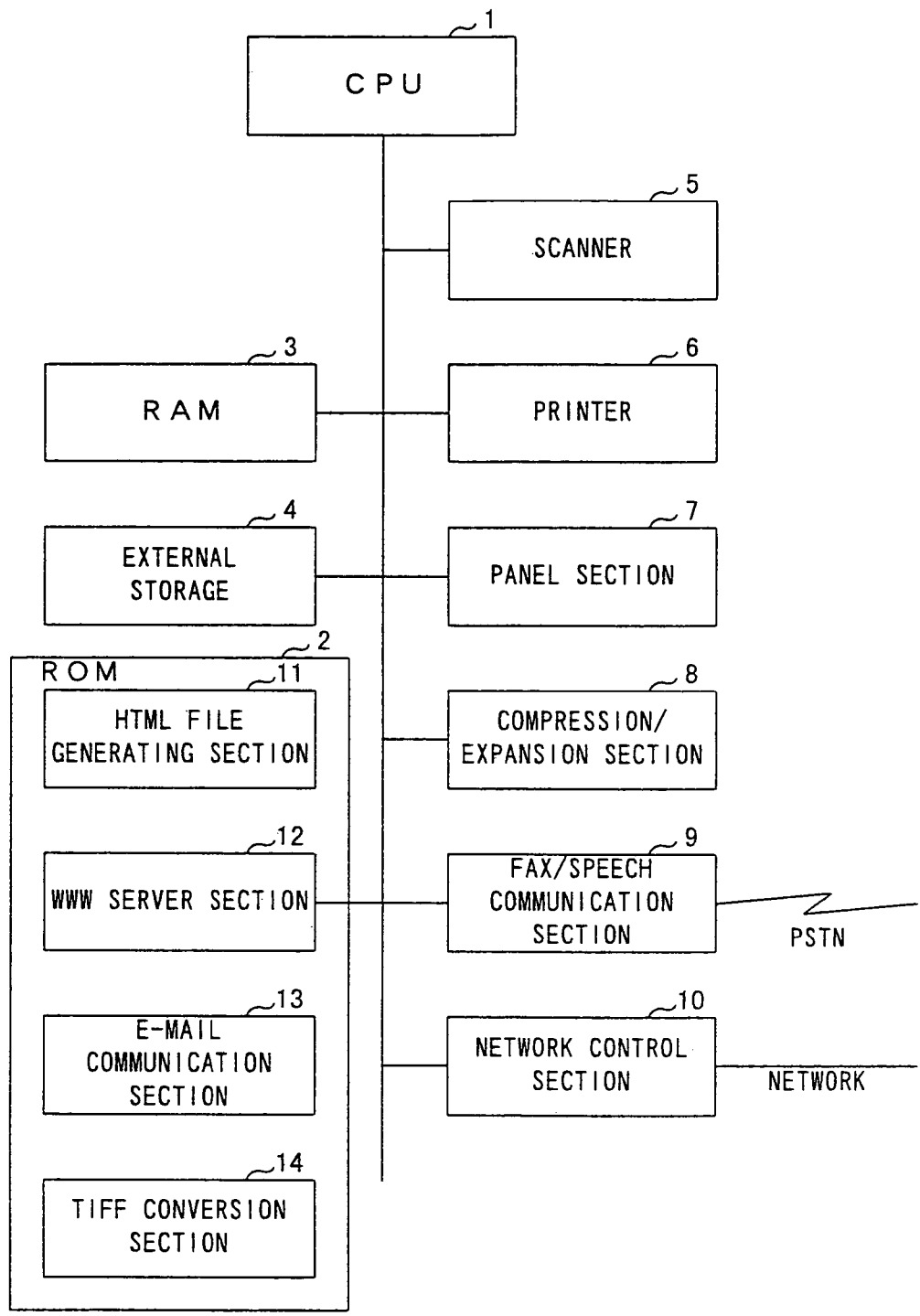
FIG. 3 is a function block diagram of a network facsimile apparatus according to an embodiment of the present invention.

FIG. 3 illustrates a function block diagram of a network facsimile apparatus according to this embodiment. ROM 2, RAM 3 and external storage 4 are connected to CPU 1 that operates by an operating system and is accessible to ROM 2, RAM 3 and external storage 4. Various programs such as processing program for a server side are stored at ROM 2. RAM 3 is used, for example, as a working area of programs stored at ROM 2. Compressed image data and HTML files are stored at external storage 4.

In addition, the network facsimile apparatus according to this embodiment has scanner 5, printer 6, panel section 7, compression/expansion section 8, FAX/speech communication section 9 and network control section 10 which operate under the control of CPU 1.

The network facsimile apparatus performs scanning of image data of, for example, document by scanner 5, and performs printing of scanned imaged and received imaged data at printer 6. A user is able to perform operations such as an instruction to scan image data and an input of destination address using panel section 7. Compression/expansion section 8 performs expansion of received image data and compression of scanned image data. FAX/speech communication section 9 performs facsimile communication and speech communication connecting to a PSTN. Network control section 10 performs the internet communication connecting to a network.

The programs stored at ROM 2 include each program for HTML file generating section 11, WWW server section 12, e-mail communication section 13 and TIFF conversion section 14. Although each function of HTML file generating section 11, WWW server section 12, e-mail communication section 13 and TIFF conversion section 14 is provided under the respective program executed by CPU 1, the respective function will be described using respective numeral symbol provided to the respective program as illustrated in FIG. 3 as a matter of accommodation.

HTML file generating section 11 converts lists of image data received by facsimile and e-mail and other data into HTML files readable on a homepage to register to a server.

WWW server section 12 provides a server function of, for example, performing communication with a WWW browser in accordance with HTTP (Hyper Text Transfer Protocol) to exchange homepage data (HTML file).

E-mail communication section 13 performs transmission and reception of e-mail via a network, while functions as an e-mail server. In addition, TIFF conversion section 14 provides a function of converting coded facsimile data and document file data into TIFF (Tag Images File Format) format that is a standard format for image files. In the case of transmitting image data scanned by scanner 5 or facsimile data stored at external storage 4 by e-mail, the data is converted into a file in TIFF at TIFF conversion section 14, and an e-mail containing the TIFF file as an attached file is generated. In other words, the TIFF file is text-coded and input to a multiple structured mail data section for, such as, MIME (Multipurpose Internet Mail Extensions). On the other hand, in the case of facsimile transmission of e-mail received data, an e-mail is converted from text code into TIFF file by binary conversion. TIFF conversion section 14 opens the TIFF file. When the TIFF file is not compressed, the data further subjected to compression processing such as MH (Modified Huffman) at compression/expansion section 8 is transmitted.

Figure 4:
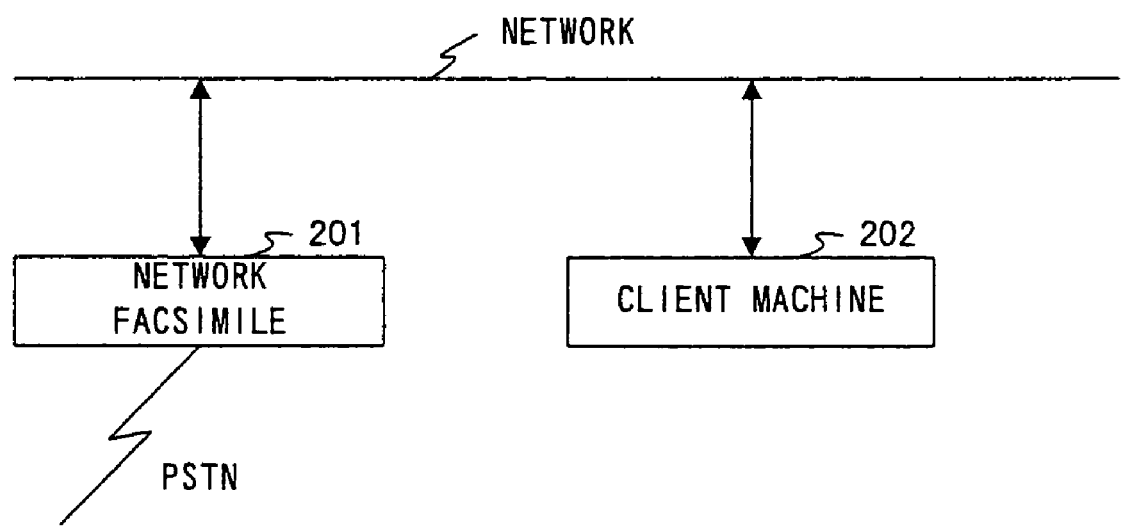
FIG. 4 is a configuration diagram of a system in which the network facsimile apparatus according to the above embodiment is connected to a client machine.

FIG. 4 illustrates a system configuration in the case of connecting a network facsimile apparatus according to this embodiment to a PSTN and a network. In FIG. 4, network facsimile apparatus 201 is connected to the PSTN while connected to the network through a network interface. It is possible to browse a homepage provided at network facsimile apparatus 201 by operating a WWW browser at client machine 202.

Figure 5:
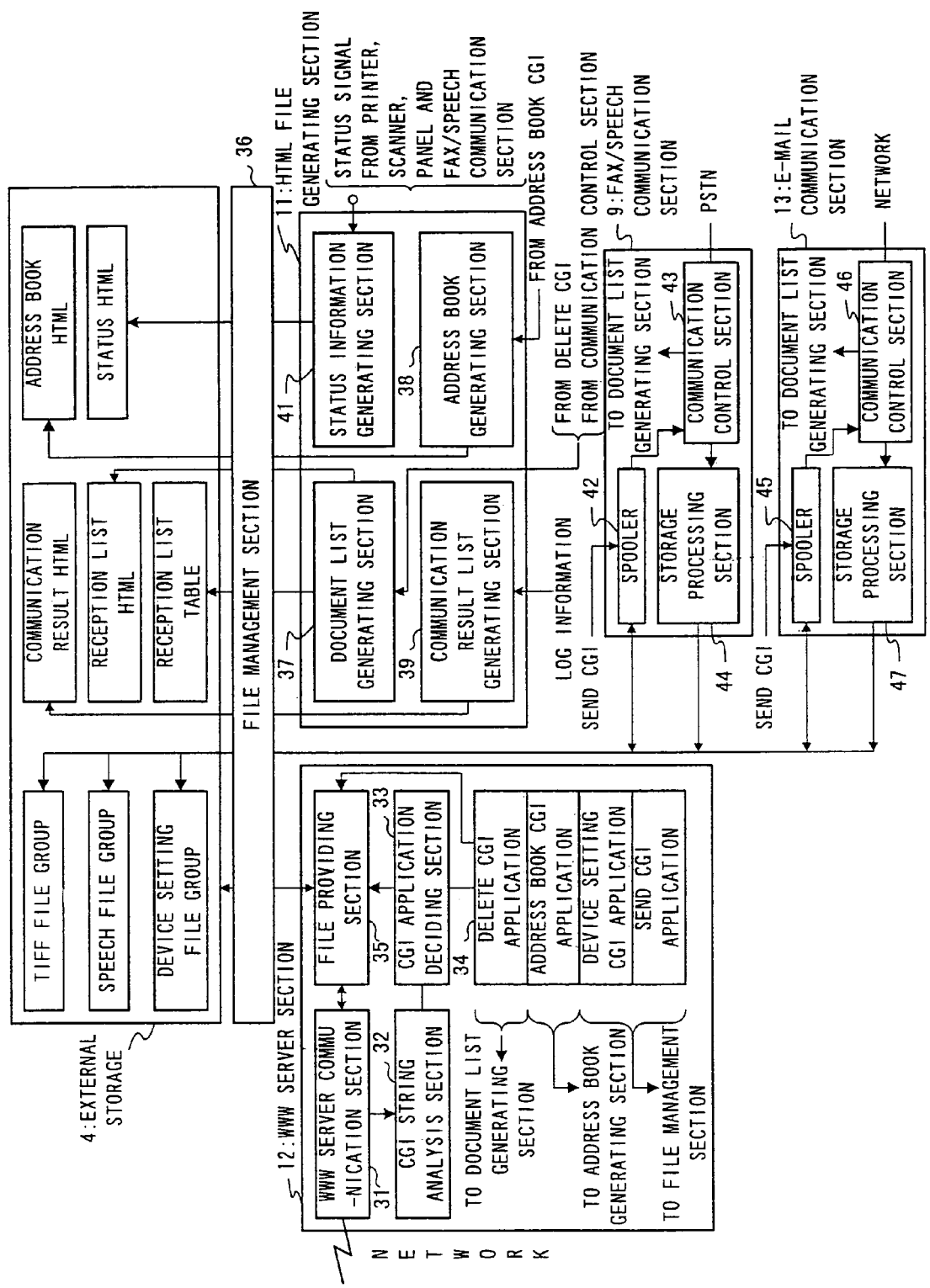
FIG. 5 is a function block diagram illustrating a flow of a part of processing in the network facsimile apparatus according to the above embodiment.

FIG. 5 illustrates a function block diagram for HTML file generating section 11, WWW server section 12, e-mail communication section 13, TIFF conversion section 14 and FAX/speech communication section 9 and a flow of data processing between the blocks.

In WWW server section 12, WWW server communication section 31 communicates with a WWW browser operating at client machine 202 in accordance with HTTP protocol. A command received at www server communication section 31 from client machine 202 is analyzed at CGI string analysis section 32.

CGI string analysis section 32 analyzes a CGI (Common Gateway Interface) string contained in received data and provides the analyzed result to CGI application deciding section 33. Based on the analyzed result, CGI application deciding section 33 starts corresponding CGI application 34. CGI application 34 executes a predetermine processing using the received data. CGI application 34 includes applications for, for example, transmission, processing such as delete, edit and move for HTML document, generation of address book, and device setting.

File providing section 35 receives a file, whose file request is provided from client machine 202, from file management section 36 to provide to WWW server communication section 31. When the file request does not requires the CGI processing, file providing section 35 requires a corresponding file to file management section 36.

HTML file generating section 11 has document list generating section 37 that generates a HTML file of document list and address book generating section 38 that generates a HTML file of address book.

Document list generating section 37 generates a HTML file of reception list indicative of received e-mail and received FAX and performs a delete, edit and move of a part of the HTML file according to an instruction provided from CGI application 34 and received data.

Address book generating section 38 modifies the HTML file of address book according to an instruction from the address book CGI application and received data. Further, address book generating section 38 executes processing to incorporate the latest address table data into the HTML file of address book when power is turned on and the content of the address book is changed.

In addition, HTML file generating section 11 has communication result list generating section 39 and status information generating section 41. Communication result list generating section 39 receives log information indicative of communication result from FAX/speech communication section 9 and e-mail communication section 13 to generate and update the HTML file indicative of the communication result list. Status information generating section 41 reads out status signals indicative of respective status from scanner 5, printer 6, panel section 7 and FAX/speech communication section 9 (for example, eruption of paper stack, lack of toner and on-communication) to generate and update a HTML file in which the respective statuses are registered.

FAX/speech communication section 9 has spooler 42, communication control section 43 and storage processing section 44. Spooler 42 receives an instruction of transmission processing, transmission document number or temporary document, FAX number of destination terminal and others from the transmission CGI application. When the transmission document number is provided, FAX/speech communication section 43 reads out transmission data (image) of the corresponding document number from external storage 4. Communication control section 43 inputs the image data provided from spooler 42 to a transmission buffer, and then connects to the PSTN to transmit to a FAX number of destination terminal. In the case of simultaneous transmission, a plurality of FAX numbers that are simultaneous transmission destinations are spooled from the transmission CGI to spooler 42.

E-mail communication section 13 has spooler 45, communication, control section 46 and storage processing section 47. Spooler 45 receives an instruction of transmission processing, transmission document number or temporary document, mail address of destination terminal and others from the transmission CGI application. When the transmission document number is provided, FAX/speech communication section 43 reads out transmission data of the corresponding document number from external storage 4. Communication control section 46 inputs the image data provided from spooler 45 to a transmission buffer, and then connects to a network such as the internet using LAN or dial-up to transmit to an e-mail address of destination terminal. In the case of simultaneous transmission, a plurality of e-mail addresses that are simultaneous transmission destinations are spooled from the transmission CGI application to spooler 45.

The operation of the network facsimile apparatus according to this embodiment will be described next. Hereinafter, each operation of generation of reception list, simultaneous transmission of stored data, device setting and generation of communication result report will be described separately.

Figure 6:
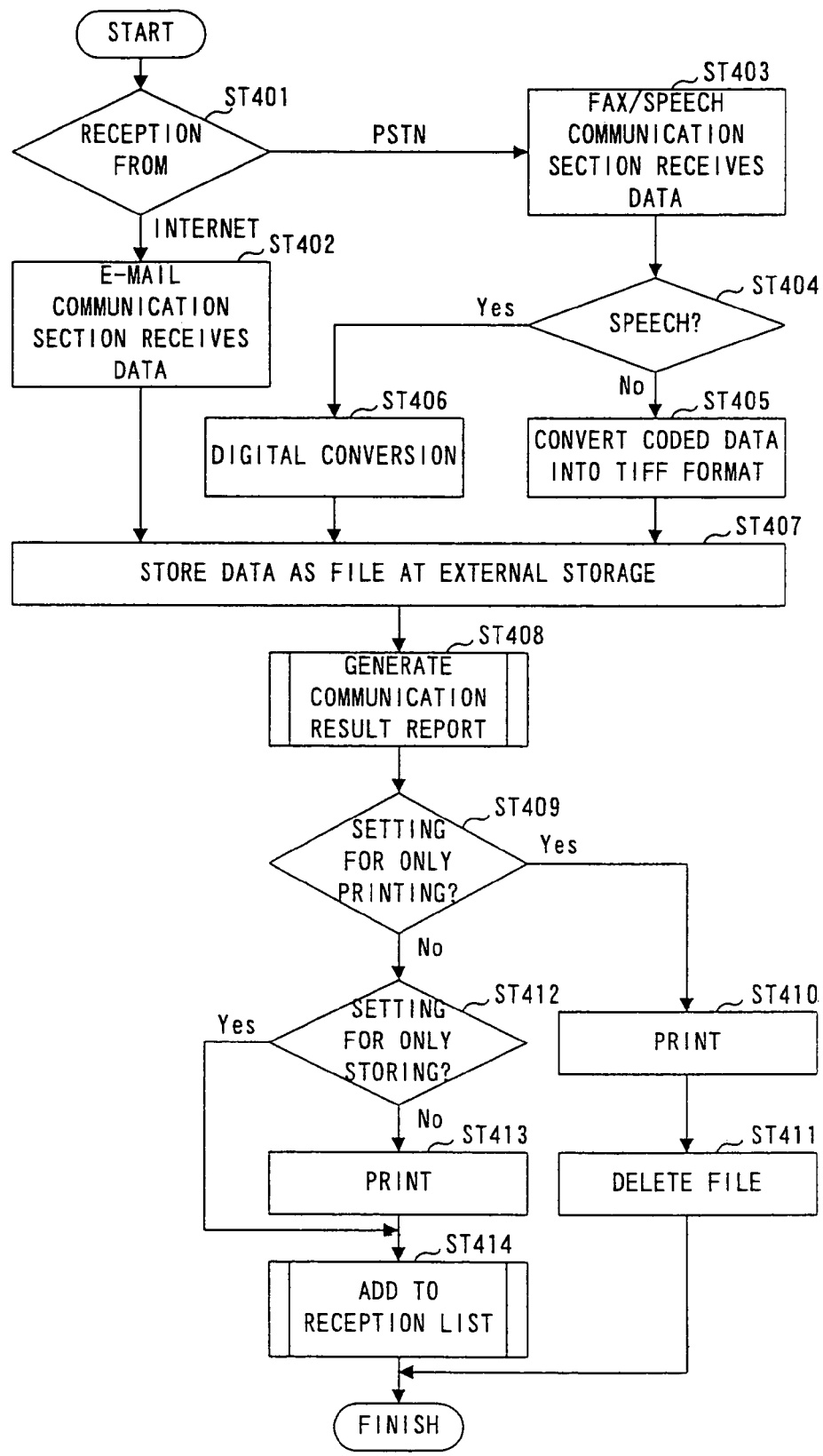
FIG. 6 is a flowchart of an operation to generate a reception list from a reception in the network facsimile apparatus according to the above embodiment.

FIG. 6 illustrates a flowchart of an operation to generate a reception list from a data reception. The network facsimile apparatus registers the reception list of received data received at FAX/speech communication section 9 and e-mail communication section 13 to a homepage.

When a data reception occurs, it is decided whether the reception of the received data is performed via the PSTN or the internet (ST401). When e-mail communication section 13 receives an e-mail, the reception is performed via the internet. In this case, e-mail communication section 13 receives the e-mail (ST402). When attached data of the e-mail is image data in TIFF format, e-mail communication section 13 stores the image data at external storage 4 providing a file name such as, for example, "mail0001.tif" (ST407). When attached data is speech data, e-mail communication section 13 stores the speech data at external storage 4 providing a file name such as, for example, "audio0001.wav" (ST407).

On the other hand, when FAX/speech communication section 9 receives FAX data or speech data, the reception is performed via the PSTN. In this case, FAX/speech communication section 9 receives image data or speech data (ST403), and decides whether or not the reception data is speech data (ST404). When the received data is coded image data, FAX/speech communication section 9 requests TIFF conversion section 14 to convert the coded data into TIFF format (ST405). FAX/speech communication section 9 provides a file name (for example, "fax0001.tif") to the TIFF-converted received data to store at external storage 4 (ST407). When the received data is speech data, FAX/speech communication section 9 converts the speech data into digital data (ST406) and stores the speech file provided with a file name at external storage 4 (ST407).

The processing for generating a communication result report, which will be described later, is next executed (ST408). It is decided whether or not the setting indicates only printing referring to the device setting (ST409). FAX/speech communication section 9 and e-mail communication section 13 fetch device setting data indicative of handling of received data from external storage 4 when power is turned on to store. When the setting indicates only printing, FAX/speech communication section 9 and e-mail communication section 13 convert the received data into printable format to provide to printer 6 along with an instruction for printing (ST410). After printing processing, FAX/communication section 9 and e-mail communication section 13 instruct file management section 36 to deleted the corresponding received data (ST411). On the other hand, when the setting does not indicate only printing, it is decided whether or not the setting indicates only storage (ST412). In the case of providing a download of received data to client machine 202, since it is only necessary to store the received data without printing, it is possible to designate "only storage" as a device setting. When the setting indicates only setting, FAX/communication section 9 and e-mail communication section 13 execute the processing for generating a reception list without printing processing (ST413). In addition, when the setting does not indicate only storage, FAX/communication section 9 and e-mail communication section 13 instruct printing processing (ST413), and then generate a reception list (ST414).

The reception list generating processing at ST414 is achieved by that HTML file generating section 11 adds a file name to the reception list and updates the HTML file of the reception list.

The update of the HTML file of reception list will be described specifically. Document list generating section 37 at HTML file generating section 11 updates the HTML file of reception list. Document list generating section 37 manages a reception list table stored at external storage 4. FIG. 7 illustrates an example of a structure of a reception list management table. In the reception list management table, document numbers, document file names, registered data, senders and titles are registered, in which the document number is provided in order of reception and the other items are registered for every document number.

Document list generating section 37 receives the document file name, registered data, sender and title from FAX/speech communication section 9 or e-mail communication section 13 that receives the corresponding data. Document list generating section 37 reads out the reception list through file management section 36, adds the document number to the reception list, and registers the document file name, registered data, sender and title to the reception list. Document list generating section 37 returns the reception list in which the document name and the other items of the received data are registered to the reception list table, while reads out a reception list html (HTML file of reception list). Document list generating section 37 adds the received data which is newly registered to the reception list to reception list html.

FIG. 8 illustrates a source file of reception list html generated with respect to the received data via a network. As illustrated in FIG. 8, a comment line is inserted at a head for every reception list. Identification data indicative of reception form and a document number are described at the position of the comment line. The comment line is followed by a document number, data, sender and title that are described in HTML document.

In addition, with respect to FAX reception list concerning FAX received image data and speech reception list concerning received speech data, the lists are similarly generated in HTML document.

As described above, when FAX/speech communication section 9 receives FAX data or e-mail communication section 13 receives an e-mail, the corresponding section inputs data necessary for the list generation (for example, sender and title) document list generating section 37. Document list generating section 37 reads out the HTML file of reception list from external storage 4 and adds those data to the reception list. Therefore, client machine 202 is able to obtain a supply of the latest reception list in homepage format by accessing to WWW server section 12.

An operation of transmitting data received and stored at the network facsimile apparatus to client machine 202 will be described next according to a flowchart in FIG. 9.

The network facsimile apparatus is in a stand-by state until a homepage address (URL address) is input.

Client machine 202 connected to a network starts a WWW browser (homepage browsing software) and inputs the URL address of the network facsimile apparatus to access the homepage (ST701).

Figure 10:
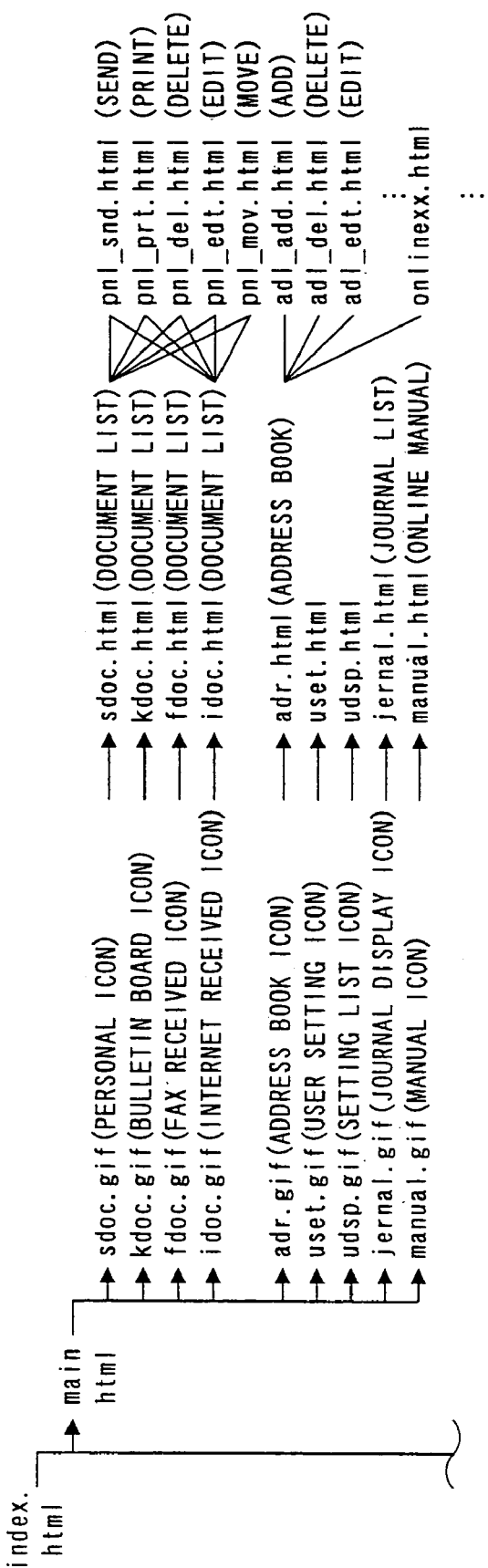
FIG. 10 is a diagram illustrating a file relation table of HTML files managed by the network facsimile apparatus according to the above embodiment.

In the network facsimile apparatus accessed, WWW server section 12 initiates the processing through network control section 10. File providing section 35 at WWW server section 12 responds to a command for requesting a file of the homepage main page (index html) received from client machine 202 and reads out the corresponding file from external storage 4 to return to the WWW browser at client machine 202 (ST702). FIG. 10 illustrates a file relation table of the HTML files registered at external storage 4. The files needed to display the homepage are related to the file of homepage main page.

When the WWW browser at client machine 202 receives the file of homepage main page, the WWW browser analyzes the content and transmits a command for requesting the files needed to display the homepage to WWW server section 12 (ST703). For example, when the homepage main page illustrated in FIG. 11 is displayed, the WWW browser at client machine 202 requests files necessary for respective icon display of facsimile received document, internet received document, personal box, bulletin board document, address book, communication result report, user setting and setting list (sdoc.gif, kdoc.gif, etc. illustrated in FIG. 10) to WWW server section 12.

When WWW server section 12 receives the request of files needed to display the homepage main page, WWW server 12 section transmits the files stored at external storage 4 to the WWW browser at client machine 202 (ST704). Thus, the homepage of the network facsimile apparatus is displayed on a screen of client machine 202 (ST705). The network facsimile apparatus stands by until next selection is performed.

Figure 11:
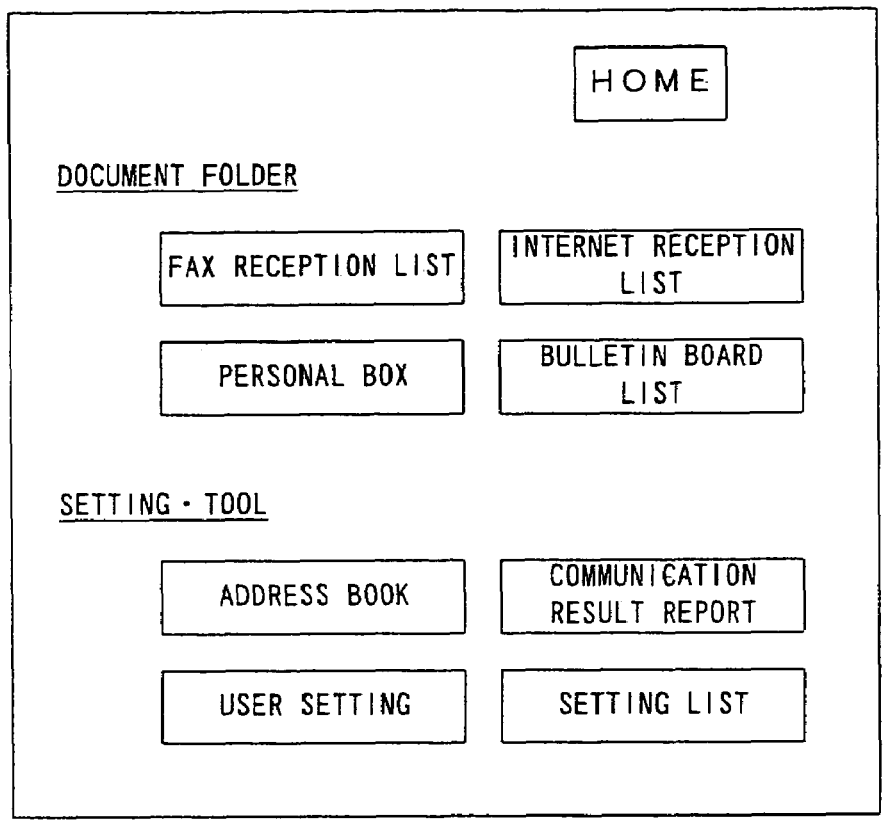
FIG. 11 is a structure diagram of a homepage main page provided by the network facsimile apparatus according to the above embodiment.

The network facsimile apparatus awaits until an icon that is desired by a user is selected on the main page illustrated in FIG. 11 displayed at client machine 202. For example, assume that an "internet reception list" icon is selected among from displayed data. When the "internet reception list" icon is selected, a file request is generated for the internet reception list that is linked to a display position of the icon (ST706).

As illustrated in FIG. 10, the icon of "internet reception list" (idoc.gif) is linked to the HTML file of internet received document page (idoc.html). The WWW browser is able to display the internet reception list using a file of idoc.html. When WWW server section 12 receives the file request for idoc.html, WWW server section 12 reads out the corresponding file from external storage 4 to transmit to client machine 202 (ST707).

The WWW browser at client machine 202 displays a page of "internet reception list" (internet received document page) according to the HTML file of "internet reception list" received from WWW server section 12 (ST708).

FIG. 12 illustrates a structure example of an internet received document page. In the internet received document page illustrated in FIG. 12, document numbers of received data registered in the reception list, check buttons for selecting each document number and information related to of each document are displayed. Further, a frame menu including transmission processing is displayed. Each frame of the frame menu illustrated in FIG. 12 is related to another file for executing the processing corresponding to the menu (for example, transmission).

A user selects a desired document number on the internet received document page at client machine 202 (ST709). The network facsimile apparatus to which a file of the selected document number is requested transmits the corresponding image data file (ST710). However, there is the case where client machine 202 does not display a downloaded file depending on file format. For example, in the case where a TIFF file is downloaded at client machine 202 which is not able to display a TIFF file, a helper application to display the TIFF file is started (ST712). The TIFF file is displayed using the helper application (ST713).

The aforementioned example describes about the case of displaying data received via a network. However, when a speech file is selected, the speech data linked to the speech file is played back at a speaker of client machine 202. The speech data includes speech data that the user records at a receiver of the network facsimile apparatus besides the speech data received from outside, and it is possible to link these speech data to the homepage and also to transmit toward outside.

Figure 13:
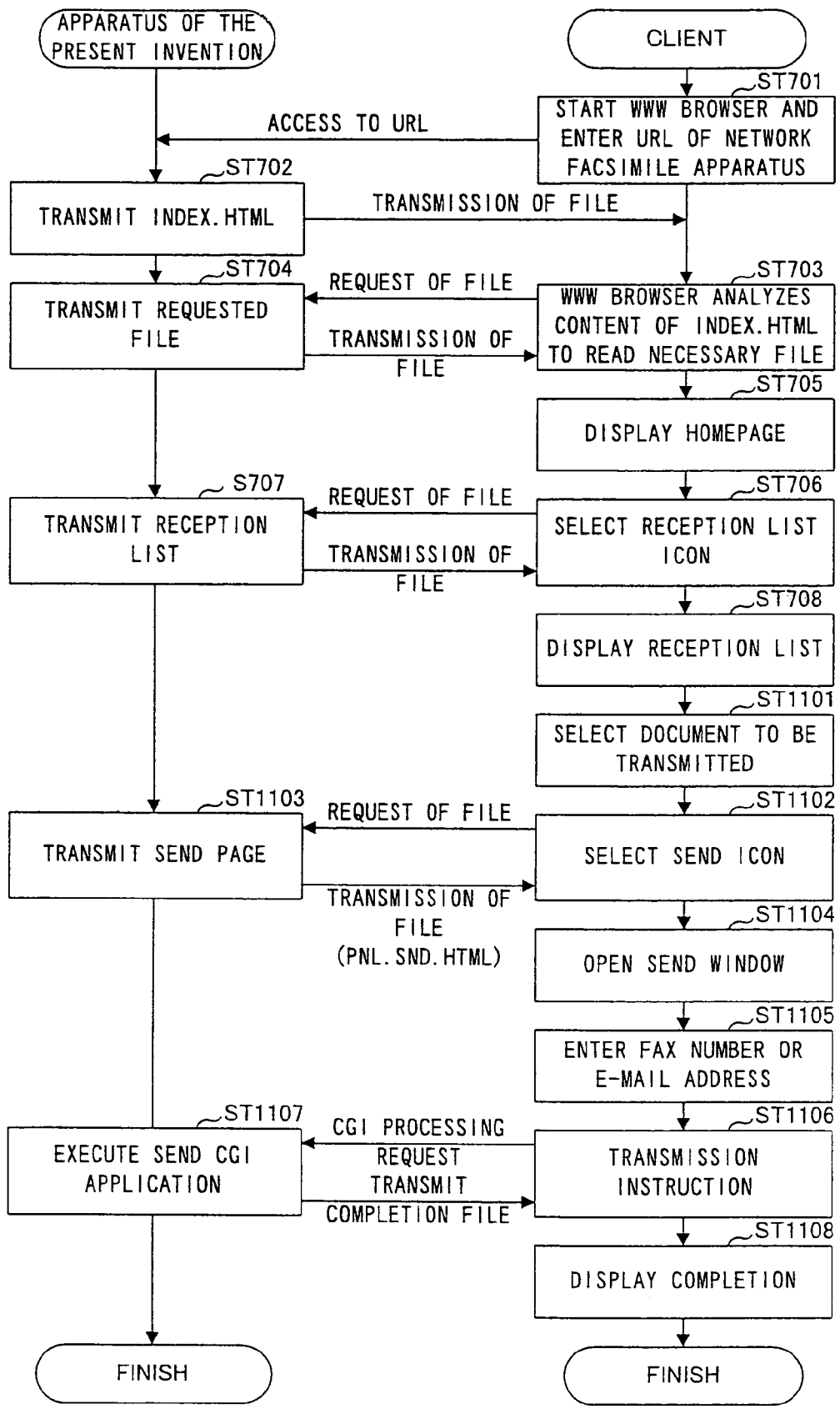
FIG. 13 is a flowchart illustrating an operation performed until a transmission is finished in the network facsimile apparatus according to the above embodiment.

The operation of the case of performing simultaneous transmission in the network facsimile apparatus will be described next. FIG. 13 illustrates a series of flowchart from a step where client machine 202 instructs a simultaneous transmission to the network facsimile apparatus to another step where the simultaneous transmission is performed to destinations.

Figure 9:
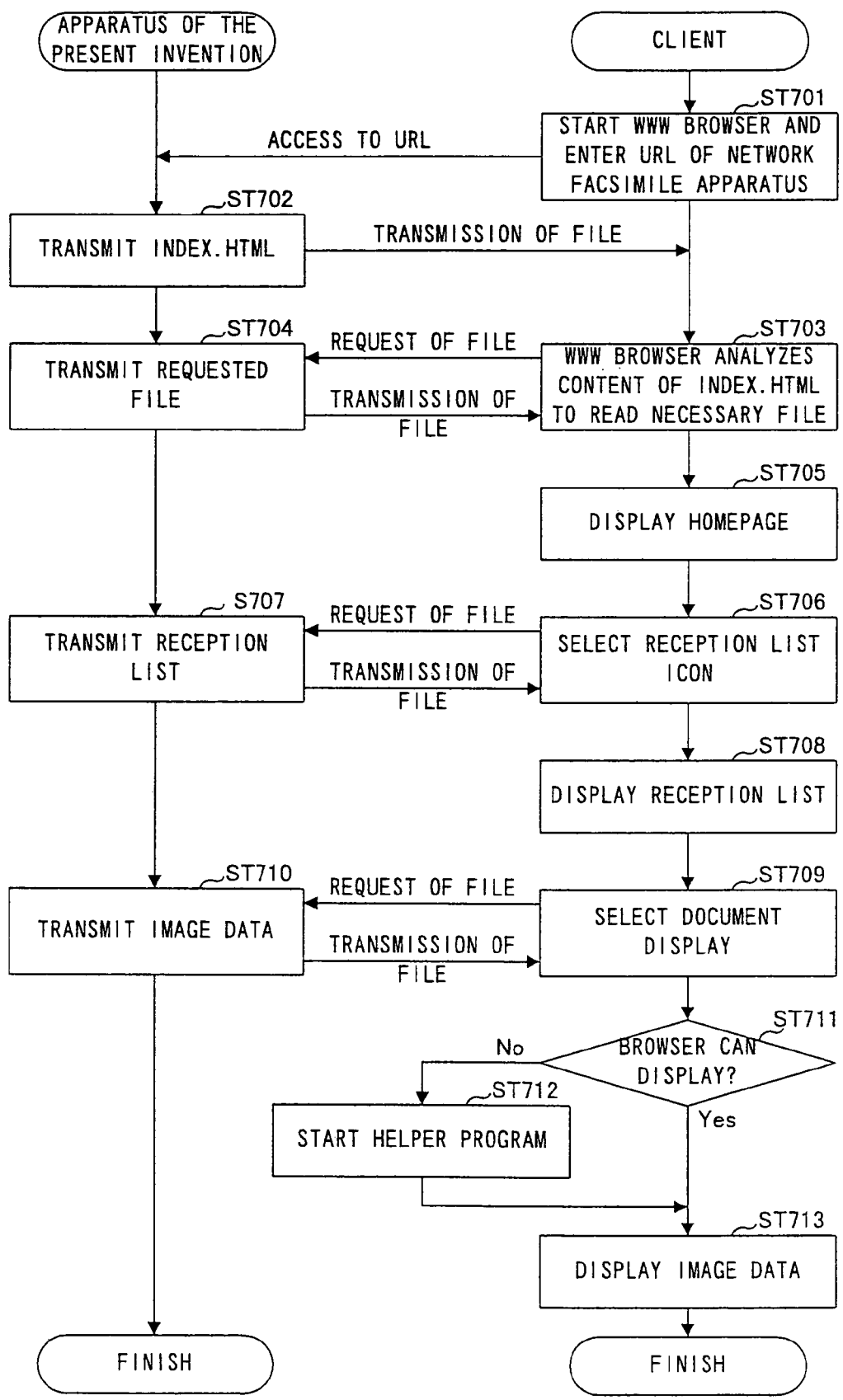
FIG. 9 is a flowchart of an operation for transmitting data received and stored at the network facsimile apparatus according to the above embodiment.

In FIG. 13, the processing of ST701 to ST708 is the same as described in FIG. 9, where client machine 202 accesses to the network facsimile apparatus using URL, and then a reception list is displayed.

Assume that an internet received document is displayed at client machine 202 at ST708. A user selects a document number to be subjected to simultaneous transmission among from internet received documents illustrated in FIG. 12 (ST1102). In addition, in the case of selecting FAX received data among from received data stored at the network facsimile apparatus to transmit (including simultaneous transmission) to another terminal, a FAX received document page is displayed as a reception list. The FAX received document page is composed in the similar way with the internet received document.

On the internet received document page, when a user selects a check button corresponding to a document number to be subjected to transmission and pushes down a send button, the selected document number is held at client machine 202, while a file request is provided for a send instruction page file (pnl.snd.html) linked related to the send button as illustrated in FIG. 10 (ST1102). The HTML document composing the internet received document page is linked to the send instruction page file (pnl.snd.html) through the send button.

WWW server section 12 reads out the send instruction page file from external storage 4 in responses to the file request for the send instruction page file (pnl.snd.html), and transmits the file to client machine 202 (ST1103). Client machine 202 receives the send instruction page file from WWW server 12 and opens a window of the send instruction page (ST1104).

Figure 14:
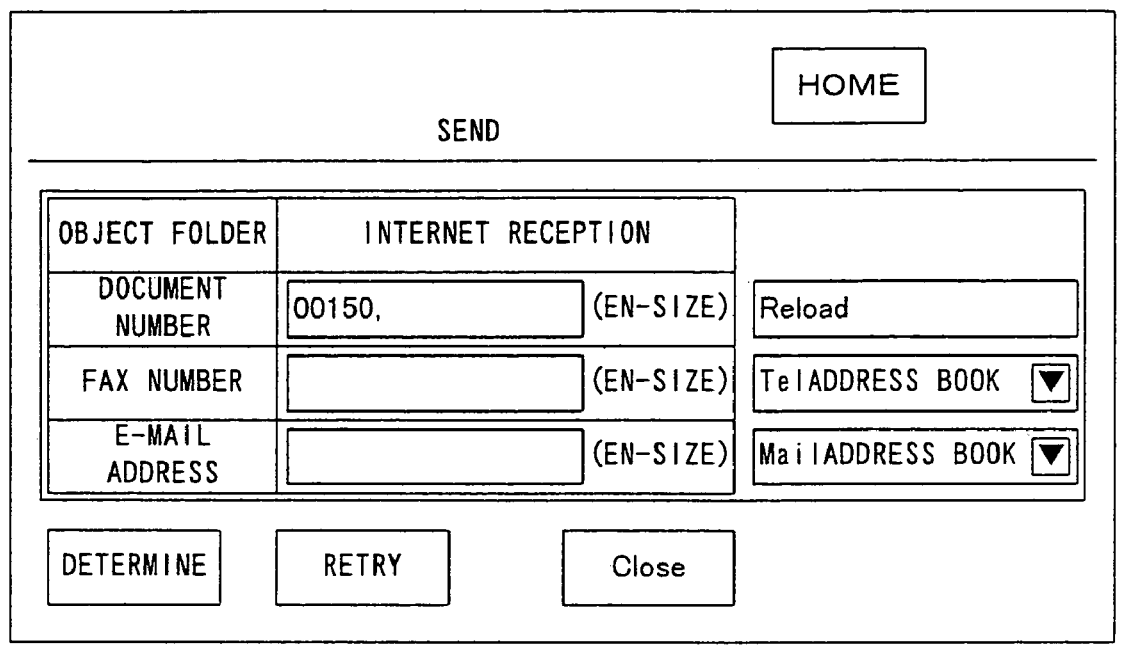
FIG. 14 is a structure diagram of a send instruction page provided in the above embodiment.

FIG. 14 illustrates a structure of the send instruction page displayed according to the send instruction page file. The send instruction page has a document number of the received data to transmit, a box to input a destination FPX number and another box to input a destination e-mail address.

A user enters data necessary for transmission (document number, facsimile number, e-mail address and others) at ST1105, while the document number to be transmitted which is selected at ST1101 and stored is automatically entered into a document number box. When a destination terminal is a facsimile apparatus, the user enters a facsimile number into a destination facsimile number. When a destination terminal is an e-mail apparatus, the user enters a destination e-mail address into a destination e-mail address.

In addition, a user is able to enter a facsimile number and e-mail address using an address book. The address book is stored at HTML format at external storage of the network facsimile apparatus, is downloaded from the network facsimile apparatus by pushing a reload button and is displayed on the send instruction page to select.

In the case of simultaneous transmission to a plurality of terminals, a user enters a plurality of facsimile numbers or e-mail addresses respectively into a facsimile number box or e-mail address box separating those addresses with comma. A plurality of document numbers are also entered with comma inserted between the document numbers when the plurality of document numbers are selected at ST1101.

When a user enters both FAX number and e-mail address, the simultaneous transmission is performed to the facsimile apparatus and e-mail apparatus. When a user enters either of FAX number or e-mail address number, an ordinary facsimile transmission or e-mail transmission is performed.

When a user pushes down a determine-button provided on the send instruction page illustrated in FIG. 14, a CGI processing request is transmitted to WWW server section 12 (ST1106). According to the CGI processing request, a CGI string for instructing a send CGI application, the document number entered on the send instruction-page, and facsimile number or e-mail address are URL encoded and transmitted to WWW server section 12.

WWW server section 12 transmits the designated document to a designated destination by executing the send CGI application in response to the CGI processing request (ST1107). WWW server section 12 further transmits the finished file to client machine 202 after the transmission is finished (ST1107). Client machine 202 receives the finished file and performs a completion display (ST1108).

Figure 15:
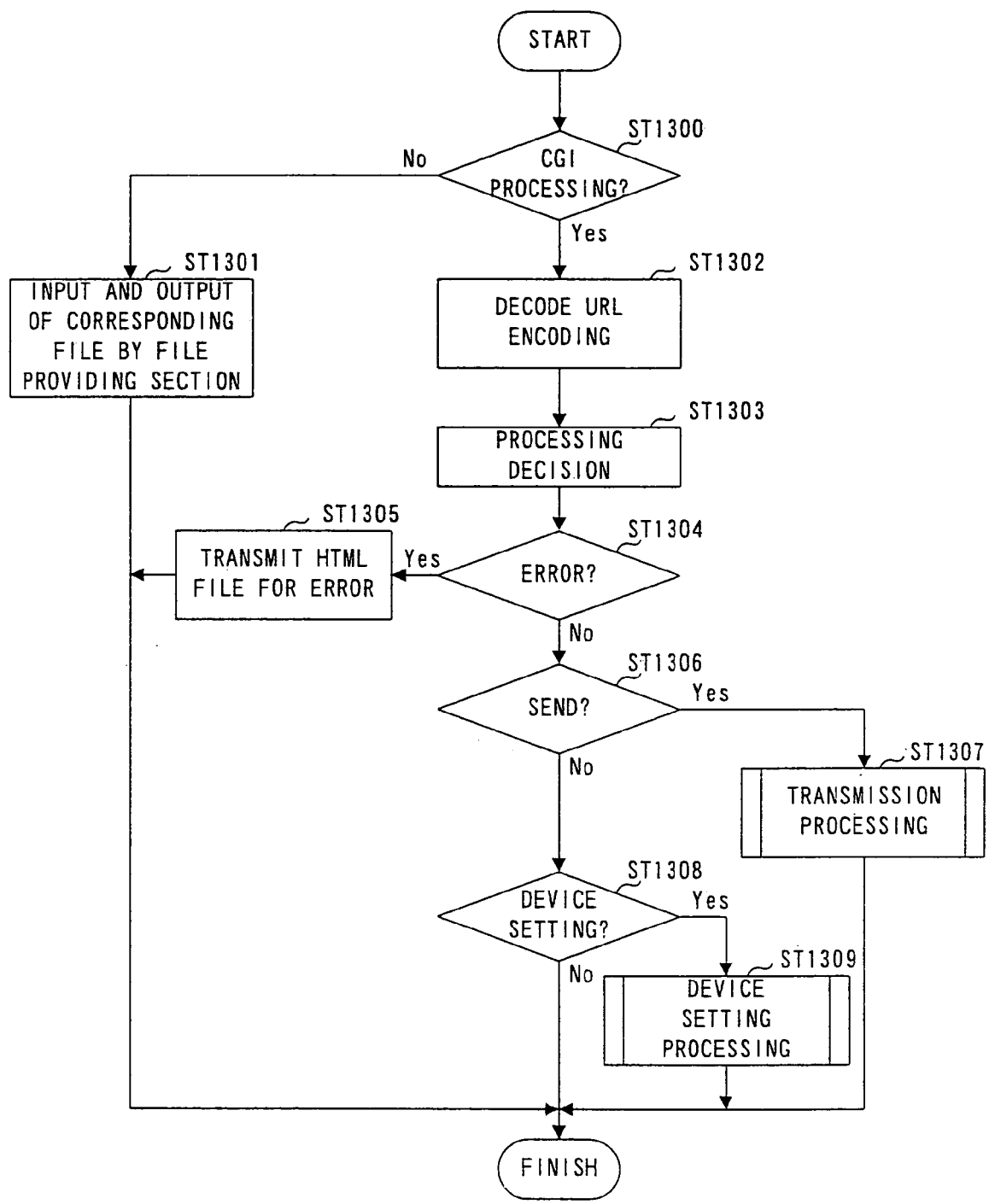
FIG. 15 is a flowchart illustrating an operation of WWW server communication section in the network facsimile apparatus according to the above embodiment.

FIG. 15 illustrates a schematic operation performed until the CGI application is executed in WWW server section 12. WWW server communication section 31 receives a request from client machine 202 via a network and returns a response, while operating in accordance with HTTP protocol. The requests which WWW server communication section 31 receives are separated into principally two; file request and CGI processing request corresponding to command.

The received data (request) received at WWW server communication section 31 is provided to CGI string analysis section 32. CGI string analysis section 31 analyzes a CGI string of the received data, and decides whether or not the received data is a CGI processing request (ST1300). When the received data is not the CGI processing request, but is a file request, the received data does not contain a CGI string. In this case, file providing section 35 reads out the corresponding file from external storage 4 based on a document number contained in the received data to transmit to client machine 202 (ST1301).

On the other hand, when received data is a CGI processing request, CGI string analysis section 32 decodes a URL encoded part of the received data (ST1302). The decoded data that is a analyzed result of the CGI string is provided to CGI application deciding section 33. CGI application deciding section 33 decides whether or not an application name is designated (ST1303), and makes an error decision when the application name is not designated (ST1304). When the error decision is made, CGI application deciding section 33 provides an error notification to file providing section 35. File providing section 35 reads out a HTML file for error notification from external storage 4 to transmit to client machine 202 (ST1305).

When an application name is designated in the decoded data, CGI application deciding section 33 decides a CGI application designated in the CGI string. When CGI application deciding section 33 decides that a send CGI application is designated in the CGI string (ST1306), CGI application deciding section 33 starts the send CGI application to provide the received data, and transmission processing which will be described later is executed (ST1307). When CGI application deciding section 33 decides that a device setting CGI application is designated in the CGI string (ST1308), CGI application deciding section 33 starts the device setting CGI application to provide to the received data, and device setting processing which will be described later is executed (ST1309).

When other CGI application supported by WWW server section 12 of this embodiment is designated, a respective CGI application is executed even though the other CGI applications are not shown in FIG. 15.

Figure 16:
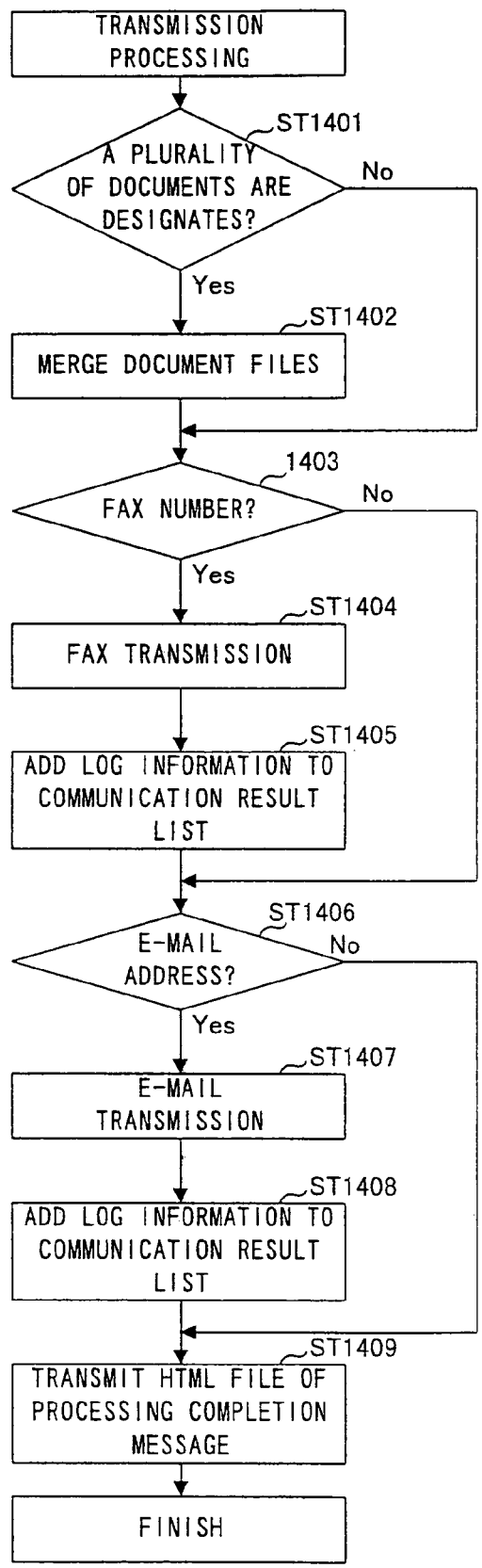
FIG. 16 is a flowchart illustrating transmission processing in the network facsimile apparatus according to the above embodiment.

FIG. 16 illustrates a flowchart of transmission processing (ST1307) in the network facsimile apparatus. The send CGI application receives received data containing a document number and a destination facsimile number or e-mail address that are received from client machine 202 from CGI application deciding section 33.

The send CGI application decides whether or not there are a plurality of documents to be transmitted at a single transmission (ST1401). When a plurality of document numbers are selected from a reception list at ST1101 described above (FIG. 13) or a plurality of document numbers are entered into the document number box at ST1105, the send CGI application decides that a plurality of documents are designated by a decision made at ST1401.

When a plurality of document numbers are designated on the send instruction page, the send CGI application merges transmission data corresponding to each document number into a single document (St1402). Since a plurality of documents are merged into a single document, it is possible to transmit a plurality of designated documents at a single communication. The merged document is treated as a temporary document. The merging processing is not necessary when a single document is designated.

The send CGI application decides whether a transmission to a destination terminal should be performed by facsimile or e-mail. Specifically, the send CGI application decides whether or not a facsimile number is entered into the facsimile number box on the send instruction page (ST1403). When a facsimile number is entered, the send CGI application executes a facsimile transmission (ST1404).

A procedure of facsimile transmission will be described specifically. The send CGI application transfers a temporary document and a facsimile number, further a command for facsimile transmission to spooler 42 at FAX/speech communication section 9. In the case of simultaneous transmission, a plurality of facsimile numbers are spooled at spooler 42. Spooler 42 provides an storage address of the temporary document and facsimile number to communication control section 43. In the case of simultaneous communication, spooler 42 provides a plurality of spooled facsimile numbers one by one along with the storage address of temporary document to communication control section 43. Communication control section 43 connects to the facsimile number provided from spooler 42 via the PSTN and transmits the temporary document by facsimile. The temporary document is deleted after the data transmissions to all destinations are completed.

In addition, when a plurality of documents are not designated on the send instruction page, a temporary document is not generated. When a designated document is one, the document number is input to spooler 42. In this case, spooler 42 reads out a document corresponding to a designated document number from external storage 4 through file management section 36.

As described above, a setting whether to save a transmitted document at external storage 4 is registered at a ROM, and the setting data is loaded at memories of FAX/speech communication 9 and e-mail communication section 13 when power is turned on. When the above setting indicates "delete", spooler 42 instructs file management section 36 to delete the corresponding file from external storage 4.

Communication control section 43 notifies communication result list generating section 39 at HTML file generating section 11 of a transmission result (normal termination or abnormal termination) as log information when a facsimile transmission is finished. Communication result list generating section 39 adds the received log information to a communication result list (ST1405). Specifically, communication result list generating section 39 reads out a communication result file generated in HTML document from external storage 4 and adds the log information to the communication result file to store at external storage 4 when receives the log information.

After the aforementioned facsimile transmission processing is finished, e-mail transmission processing is executed. In the e-mail transmission processing, the send CGI application decides whether or not an e-mail address is entered in the e-mail address box on the send instruction page (ST1406). When an e-mail address is entered, the send CGI application executes the e-mail transmission (ST1407). When the e-mail address is not entered, an e-mail transmission is not executed because an e-mail apparatus is not designated as a destination terminal.

The send CGI application provides a storage address of a temporary document or a document number, and an e-mail address to spooler 45 at e-mail communication section 13 by the same procedure as the above-described facsimile transmission. In the case of e-mail, the send CGI application is able to transmit to a plurality of e-mail addresses at a single communication. Accordingly, in the case of simultaneous transmission, spooler 45 provides all e-mail addresses to communication control section 46 at a single time. In addition, when a document other than TIFF format is designated, the send CGI application converts the document into TIFF format to transmit.

Communication control section 46 notifies communication result list generating section 39 at HTML file generating section 11 of a communication result as log information when the e-mail transmission is finished. Communication result list generating section 39 adds the received log information to a communication result list (ST1408).

In addition, when a facsimile number and an e-mail address both are entered, the send CGI application executes respective processing for the above-described facsimile transmission and e-mail transmission.

When the processing for facsimile transmission and e-mail transmission is finished as described above, the send CGI application transmits a HTML file of processing completion message to client machine 202 (ST1409). Specifically, the send CGI application inputs destination information (facsimile number and e-mail address) and a temporary document (storage address) or document number to spooler 42 and 45, requests the HTML file of processing completion message to file management section 36, and provides a transmission request of the corresponding file to file providing section 35.

According to the aforementioned processing, client machine 202 which provides the CGI processing request is able to receive the HTML file of processing completion message and is also able to notify a user of processing completion by displaying the message.

The operation for setting a handling (print or save) of FAX received document and network received document will be described next. When a user selects a "user setting" icon on the homepage main page at ST706 described previously, client machine 202 issues a file request concerning a HTML file linked to the "user setting" icon to WWW server section 12. In WWW server section 12 which receives the file request concerning the HTML file for user setting, file providing section 35 reads out corresponding user setting html from external storage 4 to transmit to client machine 202.

In client machine 202, the WWW browser displays a user setting page using the user setting html. FIG. 17 illustrates a structure example of user setting page. On the user setting page, a user is able to set three different patterns concerning a handling of received document for every FAX received document and network received document. The three patterns are (a) printing only, (b) saving only, and (c) printing and saving. Further, the user setting page is composed in order to enable a user to set a storage period of document for every FAX received document and network received document. In an example illustrated FIG. 17, storage periods are separated into 1 day, 1 week and 1 month, however it may be possible to compose the page in order to enable a user to set any storage period. When a user selects a document type, a handling type of a document and a storage period and then selects a determine-button, the setting data is transmitted to WWW server section 12 along with a CGI processing request for a device setting CGI application.

Figure 18:
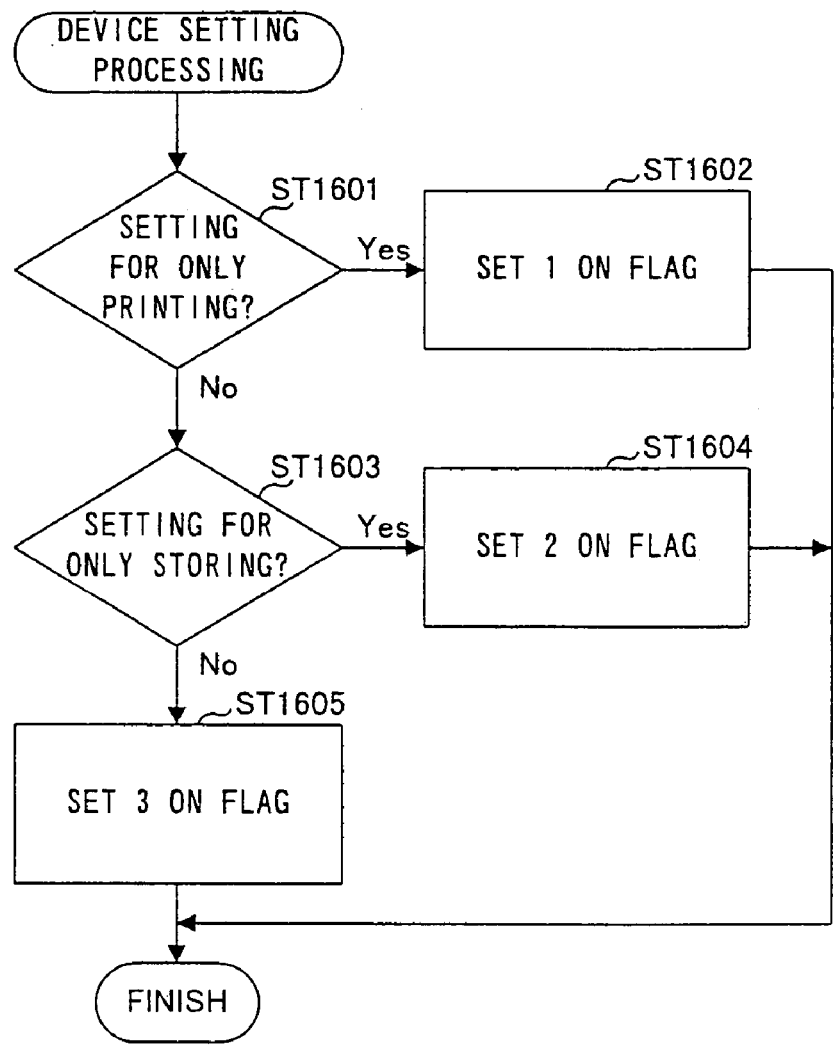
FIG. 18 is a flowchart of device setting processing in the network facsimile apparatus according to the above embodiment.

In WWW server section 12, CGI application deciding section 33 starts the device setting CGI application to provide the received setting data. FIG. 18 illustrates a flowchart of device setting processing concerning a setting of received document. The device setting CGI application receives the setting data concerning a setting of received document, which is received from client machine 202, from CGI application deciding section 33.

The device setting CGI application decides for every FAX received document and network received document whether or not the setting data indicates (a) only printing (ST1601). When a setting for any received document indicates (a) only printing, the device setting CGI application sets 1 on a flag of a setting table of the received document (ST1602). Flag=1 indicates a setting for (a) only printing. When a setting for any document does not indicate (1) only setting, the device setting CGI application decides whether or not the setting indicates (b) only saving (ST1603). When a setting for any received document indicates (b) only saving, the device setting CGI application sets 2 on a flag of a setting table of the received document (ST1604). Flag=2 indicates a setting for (b) only saving. When the setting data does not indicate any cases of ST1601 and ST1603, the device setting CGI application sets 3 on a flag of a setting table of the received document (ST1605). Flag=3 indicates a setting for (b) printing and saving.

The device setting CGI application provides the setting table in which the flag is set to file management section 36. File management section 36 stores the setting table at external storage 4. File management section 36 reads a memory area of external storage 4 at which the setting table is stored when power is turned on, and loads the setting table to spoolers 42 and 45.

In addition, the device setting CGI application registers setting data of a setting of document storage period in the same way as described above, and stores the setting table at external storage 4. The device setting CGI application loads the setting data of storage period to file management section 36 when power is turned on and refers to the setting data periodically to delete a corresponding document.

As described above, since the network facsimile apparatus displays a handling of document and document storage period on a HTML document page designated by a user at client machine 202 in response to a request from client machine 202 and provides the user entered data and device setting designation to WWW server section 12 in order to reflect in a setting table. According to the above processing, a user is able to set a handling of document and document storage period in the same operation as accessing to a homepage using client machine 202.

In addition, when a user selects a "communication result report" icon on a homepage main page at ST706 described previously, a file request for a communication result html linked to the "communication result report" is issued to WWW server section 12 from client machine 202. In WWW server section 12 which receives the file request for a HTML file for communication result report, file providing section 35 reads out the corresponding communication result report html from external storage 4 to transmit to client machine 202.

In client machine 202, the WWW browser displays a page of user communication result report using the communication result html. FIG. 19 illustrates a structure example of communication result report page. The network facsimile apparatus inputs a transmission result and reception result as a form of log information to communication result list generating section 39 when facsimile communication and/or e-mail communication is performed. Communication result list generating section 39 always updates communication result html based on the log-information indicative of the transmission result and reception result. Accordingly, the latest communication result is displayed by generating a communication result report based on the communication result html. The communication result includes a reception number that is provided serially to transmission data and received data, communication data, communication partner, a number of sheets, communication type (transmission or reception), communication duration time, mode and communication condition.

As described above, since a communication result report is generated in HTML document and the generated report is linked to a homepage main page, a user is able to know the communication result easily at client machine 202.

As described above in detail, the present invention is able to provide a network facsimile apparatus capable of decreasing network traffic caused by data transmission and of transmitting stored data to any destinations only by a transmission instruction from a client side.

The present invention is not limited to the above described embodiments, and various variations and modifications may be possible without departing from the scope of the present invention.

This application is based on the Japanese Patent Application No. HEI11-18998 filed on Jan. 27, 1999, entire content of which is expressly incorporated by reference herein.

What is claimed is:

1. A communication apparatus connected to a terminal apparatus via a network, the communication apparatus comprising:

an e-mail receiver that performs an e-mail reception via the network;

a facsimile receiver that performs a facsimile reception via a telephone network;

a file generator that generates an HTML file for a web page indicating a result of the e-mail reception performed by the e-mail receiver and a result of the facsimile reception performed by the facsimile receiver, wherein the result indicates whether the e-mail reception was a success or a failure and whether the facsimile reception was a success or a failure;

a storage that stores the HTML file generated by the file generator; and a web server that transmits the HTML file to the terminal apparatus via the network so that the web page is displayed at the terminal apparatus.

2. The communication apparatus according to claim 1, wherein the web page indicates a communication partner of the e-mail reception.

3. The communication apparatus according to claim 1, wherein the web page indicates a time and date of the e-mail reception.

4. The communication apparatus according to claim 1, further comprising a memory that stores a file attached to an e-mail received in the e-mail reception.

5. The communication apparatus according to claim 1, wherein the web page indicates a communication partner of the facsimile reception.

6. The communication apparatus according to claim 1, wherein the web page indicates a time and date of the facsimile reception.

7. The communication apparatus according to claim 1, further comprising a converter that converts facsimile data received in the facsimile reception into image data and a memory that stores the converted image data.

8. The communication apparatus according to claim 1, the HTML file being configured for transmission to the terminal apparatus independently of the transmission of the e-mail or of the facsimile to a destination.

9. The communication apparatus according to claim 1, wherein the storage stores a web page including a mark indicating a request for the result of the reception, and the web server transmits the web page to the terminal apparatus in response to an actuation of the mark, wherein the request for the result of the reception is performed by clicking the mark on the web page at the terminal apparatus.

10. A communication result informing method that informs a terminal apparatus of a result of a communication by a communication apparatus connected to the terminal apparatus via a network, the communication result informing method comprising:

performing an e-mail reception via the network;

performing a facsimile reception via a telephone network;

generating an HTML file for a web page indicating a result of the e-mail reception performed and a result of the facsimile reception performed wherein the result indicates whether the e-mail reception was a success or a failure and whether the facsimile reception was a success or a failure;

storing the generated HTML file; and transmitting the HTML file to the terminal apparatus via the network so that the web page is displayed at the terminal apparatus.

11. The communication result informing method according to claim 10, wherein the web page indicates a communication partner of the e-mail reception.

12. The communication result informing method according to claim 10, wherein the web page indicates a time and date of the e-mail reception.

13. The communication result informing method according to claim 10, further comprising storing a file attached to an e-mail received in the e-mail reception.

14. The communication result informing method according to claim 10, wherein the web page indicates a communication partner of the facsimile reception.

15. The communication result informing method according to claim 10, wherein the web page indicates a time and date of the facsimile reception.

16. The communication result method according to claim 10, further comprising converting facsimile data received in the facsimile reception into image data and storing the converted image data.

17. The communication result informing method according to claim 10, wherein the HTML file is configured for transmission to the terminal apparatus independently of the transmission of the e-mail or the facsimile to a destination.

18. The communication result informing method according to claim 10, further comprising storing a web page including a mark indicating a request for the result of the reception, and the transmitting transmits the web page to the terminal apparatus in response to an actuation of the mark, wherein the request for the result of the reception is performed by clicking the mark of the web page at the terminal apparatus.

* * * * *